United States Patent
Sindelar et al.

(10) Patent No.: US 12,400,099 B2
(45) Date of Patent: Aug. 26, 2025

(54) SYSTEMS AND METHODS FOR USING DISPLAY-ENABLED TRANSACTION CARDS

(71) Applicant: JPMORGAN CHASE BANK, N.A., New York, NY (US)

(72) Inventors: Sara Sindelar, Manhattan, NY (US); Dylan Muhlstock, Stamford, CT (US); Howard Spector, Street, MD (US); Timothy Ludwig, Glen Mills, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/606,709

(22) Filed: Mar. 15, 2024

(65) Prior Publication Data
US 2024/0311604 A1    Sep. 19, 2024

Related U.S. Application Data

(60) Provisional application No. 63/490,426, filed on Mar. 15, 2023.

(51) Int. Cl.
*G06K 19/077*    (2006.01)

(52) U.S. Cl.
CPC ............... *G06K 19/07707* (2013.01)

(58) Field of Classification Search
CPC ................................. G06K 19/07707
USPC ........................................... 235/492
See application file for complete search history.

(56) References Cited

U.S. PATENT DOCUMENTS

| 11,966,911 B1* | 4/2024 | Young | G06K 7/10297 |
| 2013/0159178 A1* | 6/2013 | Colon | G06Q 20/36 705/41 |

\* cited by examiner

*Primary Examiner* — Daniel A Hess
(74) *Attorney, Agent, or Firm* — GREENBERG TRAURIG LLP (57) ABSTRACT

Systems and methods for using display-enabled transaction cards are disclosed. A display-enabled transaction card may include: a substrate; a display on the substrate; an interface that may be configured to receive a card feature to display on the display; and a controller that may be configured to display the card feature on the display. A method may include: (1) receiving, by a controller of a display-enabled transaction card and via an interface on the display-enabled transaction card, a card feature, wherein the card feature may include card art, a reward status, or an account status; and (2) displaying, on a display of the display-enabled transaction card, the card feature.

20 Claims, 5 Drawing Sheets

SYSTEMS AND METHODS FOR USING DISPLAY-ENABLED TRANSACTION CARDS

RELATED APPLICATIONS

This application claims priority to, and the benefit of, U.S. Provisional Patent Application Ser. No. 63/490,426, filed Mar. 15, 2024, the disclosure of which is hereby incorporated, by reference, in its entirety.

BACKGROUND OF THE INVENTION

1. Field of the Invention

Embodiments are generally directed to systems and methods for using display-enabled transaction cards.

2. Description of the Related Art

Plastic credit cards have been around for years. They generally include some background art, such as the issuer's logo, account information, an expiration date, the cardholder's name, a Europay-Mastercard-Visa (EMV) chip, and a magnetic stripe. These cards provide the merchant with the information needed to conduct a transaction, but not much more.

SUMMARY OF THE INVENTION

Systems and methods for using display-enabled transaction cards are disclosed. In one embodiment, a display-enabled transaction card may include: a substrate; a display on the substrate; an interface that may be configured to receive a card feature to display on the display; and a controller that may be configured to display the card feature on the display.

In one embodiment, the display may include an e-Ink or light emitting diode display, a light emitting diode, etc.

In one embodiment, the card feature may include card art, a rewards status, an account status, etc.

In one embodiment, the interface may include a contact interface that may be configured to receive the card feature in response to being dipped into a card reader, an automated teller machine, etc.

In one embodiment, the interface may include a wireless interface that may be configured to receive the card feature from a mobile application executed by a mobile electronic device.

In one embodiment, the card feature may be synchronized to be displayed on an electronic wallet version of the display-enabled transaction card.

According to another embodiment, a method may include: (1) receiving, by a controller of a display-enabled transaction card and via an interface on the display-enabled transaction card, a card feature, wherein the card feature may include card art, a reward status, or an account status; and (2) displaying, on a display of the display-enabled transaction card, the card feature.

In one embodiment, the display may include an e-Ink or light emitting diode display, a light emitting diode, etc.

In one embodiment, the interface may include a contact interface, and the card feature may be received by the interface in response to being dipped into a card reader.

In one embodiment, the card reader may be part of a point-of-sale device, an automated teller machine.

In one embodiment, the card feature may be synchronized to be displayed on an electronic wallet version of the display-enabled transaction card.

According to another embodiment, a system may include: a source of a card feature for a transaction card, wherein the card feature may include card art, a reward status, or an account status; and a display-enabled transaction card comprising a display, a controller, and an interface that may be configured to receive the card feature from the source and to display the card feature.

In one embodiment, the source may include a point-of-sale device or an automated teller machine comprising a card reader, wherein the card feature may be received by the interface in response to the display-enabled transaction card being dipped into the card reader.

In one embodiment, the source may include a mobile application executed by a mobile electronic device, and the card feature may be received by the interface by wireless communication.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Systems and methods for using display-enabled transaction cards are disclosed.

In one embodiment, a display-enabled transaction card, such as a credit card, debit card, etc. may be provided with a dynamic display, such as an E-Ink display, a Light Emitting Diode (LED) display, an Organic Light Emitting Diode (OLED), etc. that may display card art and other information. For example, the card art, card status updates, card controls, card features, etc. may be uploaded to the display by connecting a controller or memory on the card to an electronic device, such as a computer (e.g., a workstation, desktop, laptop, notebook, tablet, etc.), a smart device (e.g., smartphone, smart watch, etc.), an Internet of Things appliance, a kiosk, a point of sale device, etc. The connection may be a wired connection, a wireless connection (e.g., NFC, Bluetooth Low Energy (BLE), WiFi, etc.), a contact-based connection, etc.

Other information, such as rewards status, account status, partner status, may be displayed. For example, if the card has not been used to conduct a transaction for a certain amount of time, the display may dim, may change colors, etc. As another example, if there is suspected fraud including the account, the display may turn red, may provide instructions to contact the issuing financial institution, etc.

Any type of information may be presented on the display as is necessary and/or desired.

For example, a user may select card art and may upload it to the display on the display-enabled transaction card by connecting the controller or memory to a device on which the user has designed the card art (e.g., a picture or drawing) and the card art may be transferred to the controller or memory. Alternatively, the user may "tap" the display-enabled transaction card to a wireless-enabled device, such as a computer, smartphone, point of sale device, etc. to upload the card art. Other data, such as transaction limits, merchant restrictions, time restrictions, etc. may also be communicated to the controller or memory in this manner.

Other non-issuer related data may be uploaded and displayed, such as a boarding pass, tickets, proof of insurance, a license, a membership card, etc.

In one embodiment, the display-enabled transaction card may also interact with a billboard, an advertisement, a beacon, another transaction card, etc. to update the display on the display-enabled transaction card. For example, when the display-enabled transaction card is in proximity of a beacon-enabled device, a transaction card, etc., the display may be triggered to change.

As another example, when the user inserts or "dips" the display-enabled transaction card into a card reader, the issuer or merchant may upload information to the card, such as dynamic account numbers, reward status (e.g., available reward points), offers, discounts, experiences, etc. The issuer may also disable the display-enabled transaction card in response to, for example, suspected fraud, a lost card, etc.

For example, as a user's status with the issuer changes, the issuer may communicate different card art, status indicators, etc. to the display-enabled transaction card and those may be displayed to the user.

In another embodiment, the user may be prompted to connect the display-enabled transaction card to the user electronic device, to visit an issuer kiosk or ATM for an update, to tap the card to the user's electronic device, to insert the display-enabled transaction card into the user electronic device, etc. for an update.

In one embodiment, a merchant may communicate offers, discounts, coupons, etc. to the card via the point-of-sale device, an in-store kiosk, via a merchant application on the user electronic device, etc.

In one embodiment, the appearance of the mobile wallet version of the card may mirror that of the display-enabled card. For example, updates may be sent to the electronic wallet via an interface (e.g., API) to the electronic wallet provider).

In one embodiment, the display-enabled card may be located using location or proximity sensing technology. For example, the display-enabled card may interface with electronic devices (e.g., mobile electronic devices) in order to locate and/or determine a distance from the electronic device to the display-enabled card.

In one embodiment, the display-enabled card may be provided with a speaker that may make a sound when activated to assist with locating the display-enabled card.

In another embodiment, the speaker may emit a sound to alert the user of changes in the display of the display-enabled card.

In one embodiment, the display-enabled card may include sensors that may detect light or pressure. When light is not sensed and/or pressure is sensed, indicating that the display-enabled card is stored in a wallet or purse, the display on the display-enable may enter a low power mode in which the display is dimmed or disabled to conserve battery.

In embodiments, communications to the display-enabled card may optionally be signed and encrypted to avoid tampering or fraud. Merchants and partners may obtain or create signed/encrypted payloads using public keys obtained from the card issuer. In embodiments, time based, salted or shared secrets may be used to increase security.

Figure 1:
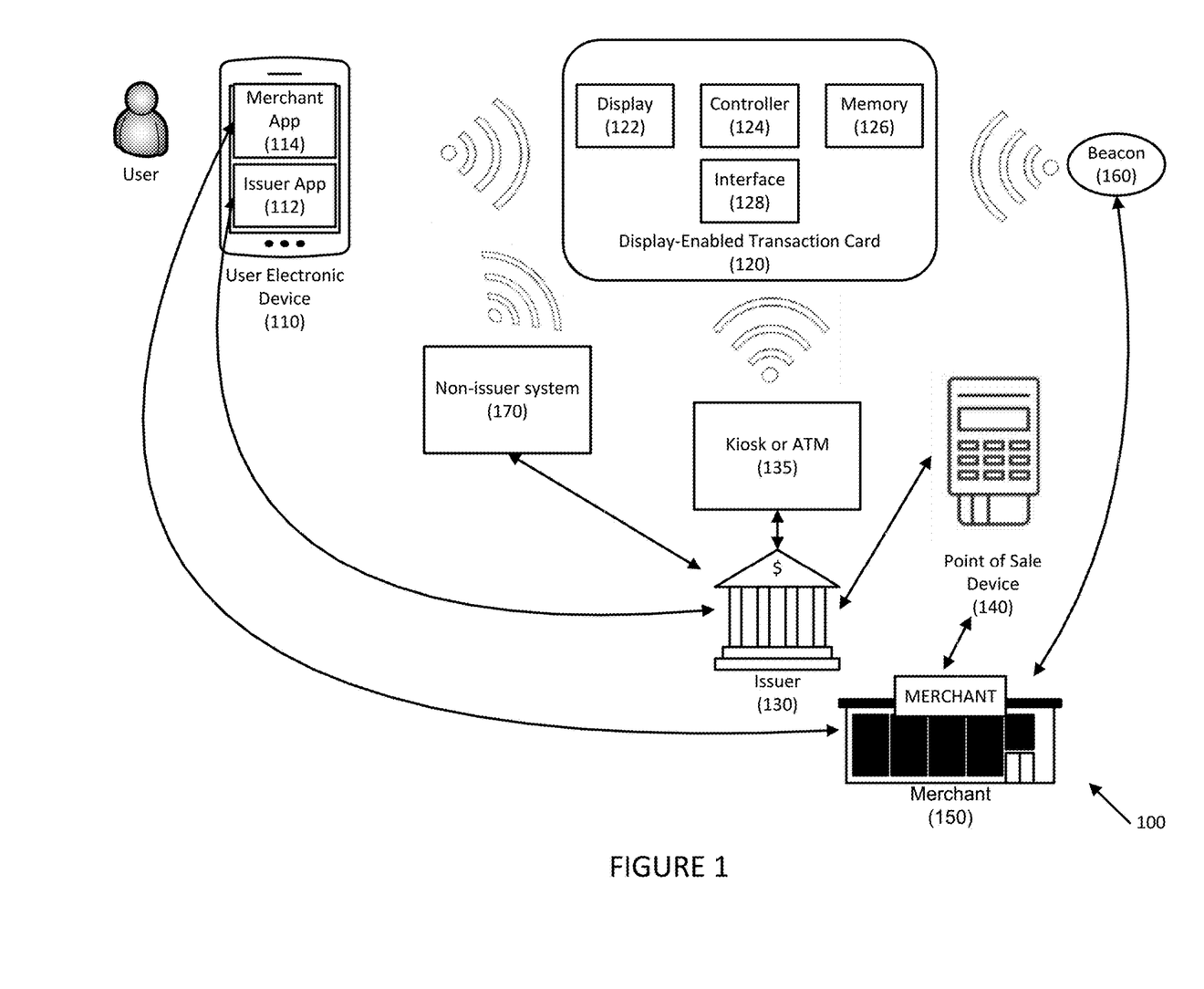
FIG. 1 depicts a system for using display-enabled transaction cards according to an embodiment.

Referring to FIG. 1, a system for using display-enabled transaction cards is disclosed according to an embodiment. System 100 may include user electronic device 110, which may be a computer (e.g., workstation, desktop, laptop, notebook, tablet, etc.), a smart phone, an Internet of Things appliance, etc. User electronic device 110 may execute one or more computer programs, such as issuer app 112, merchant app 114, etc. Note that issuer app 112 may be associated with a backend for issuer 130, and merchant app 114 may be associated with a backend for merchant 150.

User electronic device 110 may provide a communication interface for display-enabled transaction card 120, such as a wired interface, a wireless interface (e.g., NFC, BLE, WiFi, etc.), a contact-based interface, etc.

A backend for issuer 130 may provide one or more kiosks or automated teller machines (ATMs) 135. Kiosks or ATMs 135 may provide data, updates, etc. to display-enabled transaction card 120.

A backend for merchant 150 may provide one or more point of sale devices 140 that may communicate data to display-enabled transaction card 120 when, for example, display-enabled transaction card 120 is tapped or presented to point of sale device, when it is dipped in point-of-sale device 140, etc.

The backend for merchant 150 may also provide beacons 160, kiosks, etc. through which data may be communicated.

Display-enabled transaction card 120 may be made of a substrate, and may include display 122, which may be any suitable display. Examples of suitable displays include E-Ink displays, LED displays, OLED displays, etc.

The substrate may be any suitable material that may be used for a transaction card, including plastic, metal, resins, ceramics, etc.

Display-enabled transaction card 120 may also include controller 124, which may be any suitable controller, including a processor, an integrated circuit, etc. Controller 124 may interface with memory 126, which may store data, such as card art, offers, restrictions, coupons, cardholder status, reward status, and any other data that may control the operation of transaction card 120 or the display of information on display 122.

Display-enabled transaction card 120 may include interface 128, which may be any suitable interface, including wired interfaces, wireless interfaces, etc.

Display-enabled transaction card 120 may also include a battery or power source (not shown).

In one embodiment, power may be wirelessly provided by, for example, inductive charging or similar. For example, power may be provided to the display-enabled card as it is passed through a radio frequency field, such a RFID field, a Near Field Communication field, etc.

In one embodiment, display-enabled transaction card 120 may interact with non-issuer systems 170, such as a transportation system (e.g., a train, subway, bus, plane, etc.) or with a gated access area (e.g., a concert venue, theater, lounge, etc.) not only to provide access to the transportation system or area, but to update display 122 to show the customer's status, seat number, etc. Non-issuer systems 170 may send updates to issuer 130.

For example, non-issuer system 170 may send, via API or any suitable mechanism, an update to issuer 130 that may, at a later time, update the display on display-enabled transaction card 120. If non-issuer system 170 is unable to send an update to display-enabled transaction card 120 through its interaction device (e.g., a fare kiosk, entry point, etc.) or any other gated system, the non-issuer system may use information read from display-enabled transaction card 120 to send an update to issuer 130, and issuer 130 may update display-enabled transaction card 120 via issuer app 112, kiosk or ATM 135, etc. Issuer app 112 may provide an indication to the user to update display-enabled transaction card 120.

In another embodiment, issuer 130, merchant 150, non-issuer systems 170, and/or third parties (not shown) may communicate messages to display-enabled transaction card 120 using one or more beacon 160. For example, as display-enabled transaction card 120 passes within a certain distance of beacon 160, messages, such as advertisements, offers, information, etc. may be communicated to display-enabled transaction card 120 to be displayed.

Figure 2:
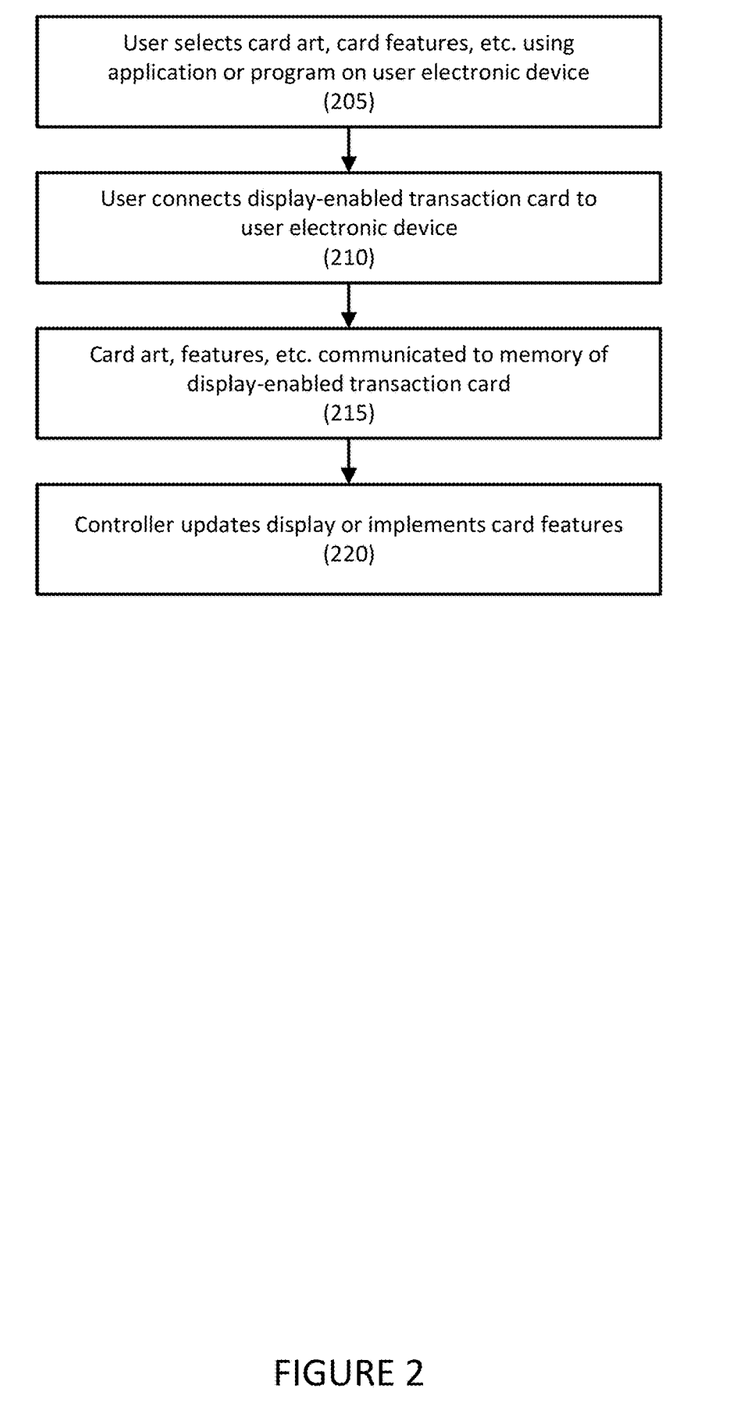
FIG. 2 depicts a method for using display-enabled transaction cards according to an embodiment.

Referring to FIG. 2, a method for using display-enabled transaction cards is disclosed according to an embodiment.

In step 205, using a user electronic device, such as computer, a mobile electronic device, an IoT appliance, etc., a user may select card art, card features (e.g., materials, etc.), etc. using an application or computer program on the user electronic device. For example, the user may select an image or picture, a drawing, etc., may select certain card features, etc.

In one embodiment, the computer program may retrieve certain card information (e.g., card logo, reward status, cardholder status, etc.) from the issuer. For example, the user may select the card art and features using an issuer application, and the issuer application may retrieve cardholder status information for the user.

In step 210, the user may connect a display-enabled card to the user electronic device. The user may connect the display-enabled card using a wired interface, a wireless interface (e.g., NFC, BLE, WiFi, etc.), a contact-based interface, etc.

In step 215, the selected card art, features, issuer information, etc. may be communicated to a memory of the display-enabled transaction card over the connection. For example, the application or computer program may communicate the data to the memory of the display-enabled transaction card.

In step 220, a controller on the display-enabled transaction card may update the display based on the uploaded card art and/or features. In one embodiment, the display may be always on (e.g., E-Ink), may be on when receiving power from a source (e.g., from a kiosk or point of sale device), may be on when activated by the user (e.g., by depressing a button, etc.).

Figure 3:
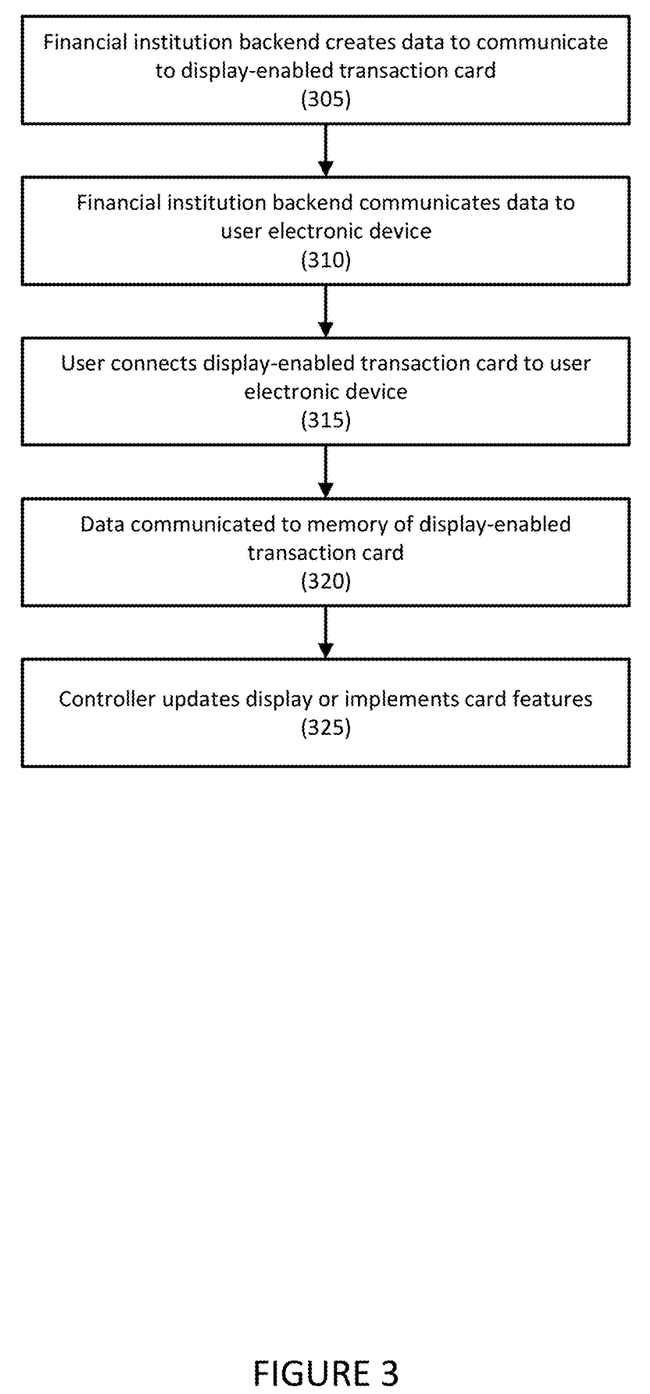
FIG. 3 depicts a method for using display-enabled transaction cards according to another embodiment.

Referring to FIG. 3, a method for using display-enabled transaction cards is disclosed according to another embodiment.

In step 305, a financial institution backend may create data to communicate to a display-enabled transaction card. The data may be card art, status information (e.g., a cardholder status indicator, reward status information, etc.), graphical data (e.g., a boarding pass, a ticket, a QR code for receiving or sending money, etc.), etc.

In one embodiment, the financial institution backend may receive the data from third party backends. For example, the financial institution backend may receive boarding pass information, ticket information, etc. from third party backends.

In step 310, the financial institution backend may communicate the data to a user electronic device, such as a computer, smart device, an IoT appliance, etc. For example, the financial institution may communicate the data to an application or computer program executed by the user electronic device. The application or computer program may be associated with the financial institution.

In step 315, the user may connect the display-enabled card using a wired interface, a wireless interface (e.g., NFC, BLE, WiFi, etc.), a contact-based interface, etc.

In step 320, the selected card art, features, etc. may be communicated to a memory of the display-enabled transaction card over the connection. For example, the application or computer program may communicate the data to the memory of the display-enabled transaction card.

In step 325, a controller on the display-enabled transaction card may update the display based on the uploaded card art and/or features. In one embodiment, the display may be always on (e.g., E-Ink), may be on when receiving power from a source (e.g., from a kiosk or point of sale device), may be on when activated by the user (e.g., by depressing a button, etc.).

Figure 4:
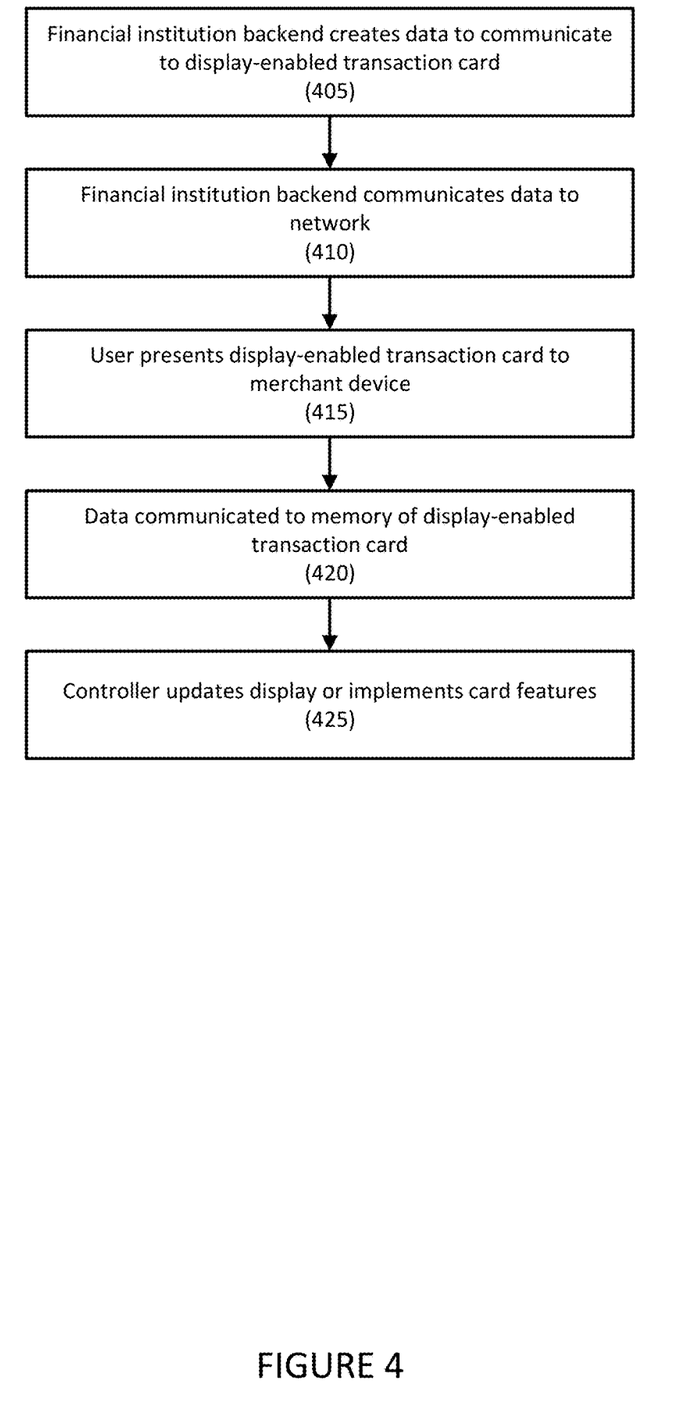
FIG. 4 depicts a method for using display-enabled transaction cards according to another embodiment.

Referring to FIG. 4, a method for using display-enabled transaction cards is disclosed according to another embodiment.

In step 405, a financial institution backend may create data to communicate to a display-enabled transaction card. The data may be card art, status information (e.g., a cardholder status indicator), reward information (e.g., available reward points), graphical data (e.g., a boarding pass, a ticket, a QR code for receiving or sending money, etc.), etc.

In one embodiment, the financial institution backend may receive the data from third party backends. For example, the financial institution backend may receive boarding pass information, ticket information, etc. from third party backends.

In step 410, the financial institution backend may communicate the data to a network, such as a payment network, a merchant network, etc.

In another embodiment, the financial institution backend may communicate the data to a financial institution device, such as an ATM, a kiosk, etc.

In step 415, the user may present a display-enabled card to a merchant device using, for example, a wireless interface (e.g., NFC, BLE, WiFi, etc.), a contact-based interface, etc. The merchant device may be a point-of-sale device, a kiosk, a beacon, etc. In one embodiment, the user may present the display-enabled card during a transaction by tapping or inserting the card into the merchant device.

In step 420, the selected card art, features, etc. may be communicated to a memory of the display-enabled transaction card over the connection. For example, the application or computer program may communicate the data to the memory of the display-enabled transaction card.

In step 425, a controller on the display-enabled transaction card may update the display based on the uploaded card art and/or features.

In one embodiment, the display may be always on (e.g., E-Ink), may be on when receiving power from a source (e.g., from a kiosk or point of sale device), may be on when activated by the user (e.g., by depressing a button, etc.).

Figure 5:
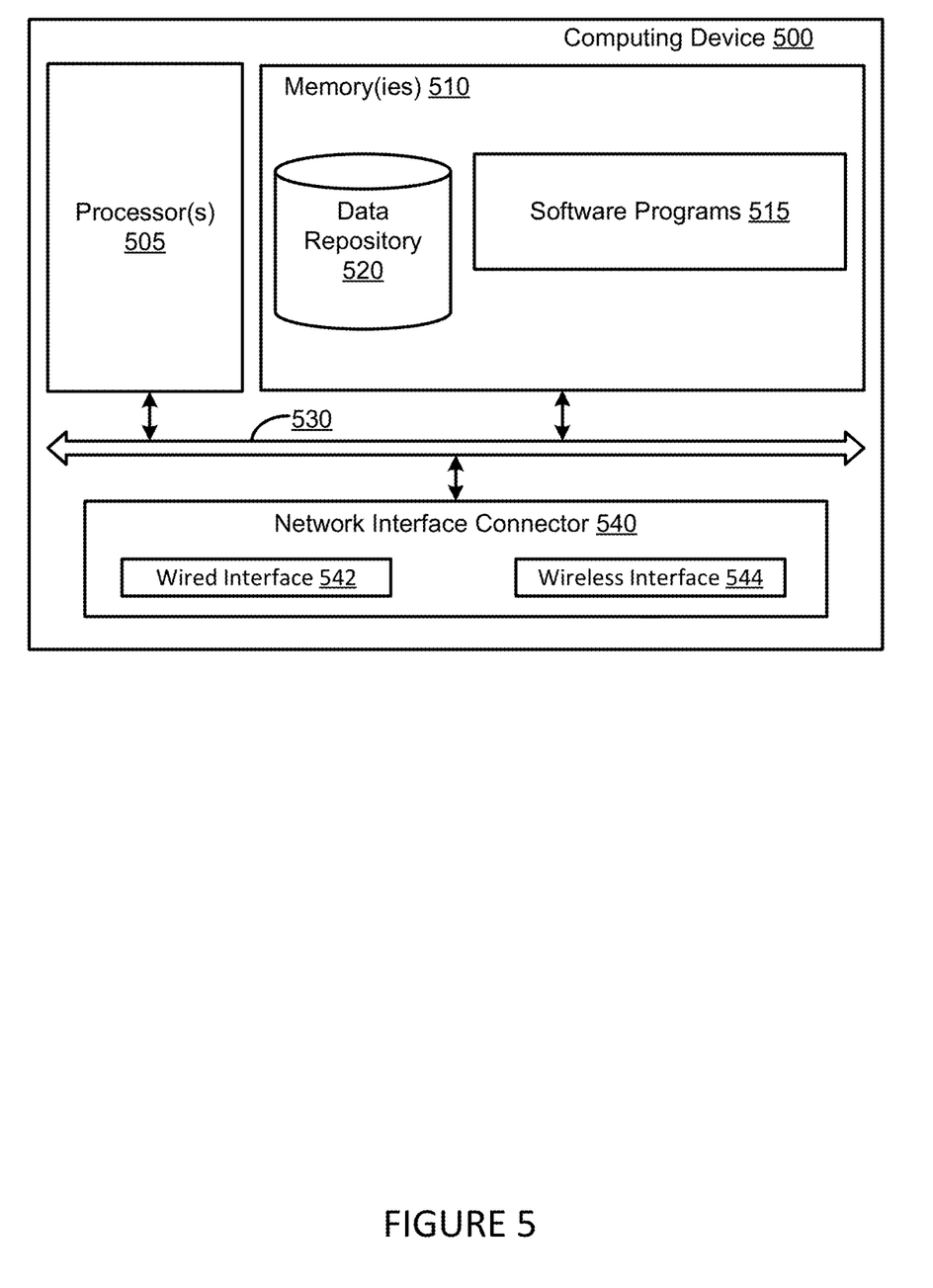
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Additional details may be found in the attached Appendix, the disclosure of which is hereby incorporated, by reference, in its entirety.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A display-enabled transaction card, comprising:
   a card comprising a substrate;
   a display on the substrate;
   an interface that is configured to receive a card feature to display on the display, the card feature being received from a user electronic device;
   a memory that stores the card feature; and
   a controller that is configured to display the card feature on the display.

2. The display-enabled transaction card of claim 1, wherein the display comprises an e-Ink display.

3. The display-enabled transaction card of claim 1, wherein the display comprises a light emitting diode.

4. The display-enabled transaction card of claim 1, wherein the card feature comprises card art and an account status.

5. The display-enabled transaction card of claim 1, wherein the card feature comprises a rewards status.

6. The display-enabled transaction card of claim 1, further comprising a button, wherein the display is activated when the button is pressed.

7. The display-enabled transaction card of claim 1, wherein the interface comprises a contact interface that is configured to receive the card feature in response to being dipped into a card reader.

8. The display-enabled transaction card of claim 7, wherein the card reader is part of a point-of-sale device.

9. The display-enabled transaction card of claim 1, wherein a card issuer system receives from a non-issuer system an update to the card feature, wherein the card issuer system communicates the card feature to the interface at a later time.

10. The display-enabled transaction card of claim 1, wherein the card feature is synchronized to be displayed on an electronic wallet version of the display-enabled transaction card.

11. A method, comprising:
    receiving, by a controller of a display-enabled transaction card and via an interface on the display-enabled transaction card, a card feature, wherein the card feature comprises card art, a reward status, and an account status, the card feature being received from a user electronic device;
    storing, by a memory of the display-enabled transaction card, the card feature; and displaying, on a display of the display-enabled transaction card, the card feature.

12. The method of claim 11, wherein the display comprises an e-Ink display.

13. The method of claim 11, wherein the display comprises a light emitting diode.

14. The method of claim 11, wherein the interface comprises a contact interface, and the card feature is received by the interface in response to being dipped into a card reader.

15. The method of claim 14, wherein a card issuer system receives from a non-issuer system an update to the card feature, wherein the card issuer system communicates the card feature to the interface at a later time.

16. The method of claim 14, wherein the card reader is part of an automated teller machine.

17. The method of claim 11, wherein the card feature is synchronized to be displayed on an electronic wallet version of the display-enabled transaction card.

18. A system, comprising:
a source of a card feature for a transaction card, wherein the card feature comprises card art, a reward status, and an account status; and
a display-enabled transaction card comprising a display, a controller, and an interface that is configured to receive the card feature from the source, to store the card feature on a memory, and to display the card feature.

19. The system of claim 18, wherein the source comprises a point-of-sale device or an automated teller machine comprising a card reader, wherein the card feature is received by the interface in response to the display-enabled transaction card being dipped into the card reader.

20. The system of claim 18, wherein the source receives from a non-issuer system an update to the card feature, wherein the card issuer system communicates the card feature to the interface at a later time, and the card feature is received by the interface by wireless communication.

* * * * *